(12) United States Patent
Denny-Brown et al.

(10) Patent No.: US 12,665,935 B2
(45) Date of Patent: Jun. 23, 2026

(54) EXECUTION NODE SECURITY USING MULTIPLE GATEWAY ENDPOINTS

(71) Applicant: Snowflake Inc., Bozeman, MT (US)

(72) Inventors: Derek Denny-Brown, Seattle, WA (US); Ajay Shridhar Joshi, Kirkland, WA (US); Xuguang Yang, Bellevue, WA (US); Haowei Yu, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 94 days.

(21) Appl. No.: 18/904,287

(22) Filed: Oct. 2, 2024

(65) Prior Publication Data

US 2026/0095486 A1     Apr. 2, 2026

(51) Int. Cl.
*H04L 9/40* (2022.01)
*H04L 67/1097* (2022.01)
*H04L 67/63* (2022.01)

(52) U.S. Cl.
CPC .......... *H04L 63/20* (2013.01); *H04L 63/0245* (2013.01); *H04L 67/1097* (2013.01); *H04L 67/63* (2022.05)

(58) Field of Classification Search
CPC . H04L 63/20; H04L 63/0245; H04L 67/1097; H04L 67/63
See application file for complete search history.

(56) References Cited

U.S. PATENT DOCUMENTS

| | | | | |
|---|---|---|---|---|
| 8,739,272 B1 * | 5/2014 | Cooper | ................... | H04L 63/20 |
| | | | | 726/13 |
| 12,132,764 B2 * | 10/2024 | Yancey | ................. | H04L 63/101 |
| 2010/0293382 A1 * | 11/2010 | Hammad | .............. | H04L 9/3234 |
| | | | | 713/172 |
| 2011/0047610 A1 * | 2/2011 | Mylavarapu | ........ | H04L 63/0428 |
| | | | | 726/12 |
| 2014/0250492 A1 * | 9/2014 | Cooper | ................... | H04L 63/20 |
| | | | | 726/1 |
| 2014/0289830 A1 * | 9/2014 | Lemaster | ................ | H04L 63/08 |
| | | | | 726/12 |
| 2015/0281122 A1 * | 10/2015 | Hoffman | ............... | H04L 61/103 |
| | | | | 709/203 |
| 2020/0028836 A1 * | 1/2020 | Gandhi | ................. | H04L 63/062 |
| 2022/0045987 A1 * | 2/2022 | Warburton | .......... | H04L 63/0245 |
| 2023/0115001 A1 * | 4/2023 | Warburton | .......... | H04L 63/0245 |
| | | | | 726/1 |
| 2023/0123781 A1 * | 4/2023 | Kaimal | ................... | H04L 43/50 |
| | | | | 726/12 |

(Continued)

*Primary Examiner* — Cheng-Feng Huang

(74) *Attorney, Agent, or Firm* — Schwegman Lundberg & Woessner, P.A.

(57) ABSTRACT

A system and method for enhancing data storage security in cloud environments using multiple gateway endpoints. The system includes a cloud data platform with a plurality of networks, each associated with a different gateway endpoint. Each gateway endpoint has a respective gateway endpoint tag. The method involves creating networks and corresponding gateway endpoints, configuring each gateway endpoint to enable traffic for sessions associated with the gateway endpoint tag, and assigning execution nodes to networks with session tokens that include the gateway endpoint tag. This setup ensures that only sessions with the correct tag can access data storage, reducing the risk of unauthorized data exfiltration.

20 Claims, 7 Drawing Sheets

(56)          References Cited

U.S. PATENT DOCUMENTS

| | | | |
|---|---|---|---|
| 2023/0283644 A1* | 9/2023 | Yancey ................. | H04L 63/101 |
| | | | 726/1 |
| 2024/0056388 A1* | 2/2024 | Chen ....................... | H04L 45/54 |
| 2025/0158829 A1* | 5/2025 | Argulkar .............. | H04L 9/3247 |

* cited by examiner

EXECUTION NODES ARE PLACED ON MULTIPLE SUBNETS

PLACE EXECUTION NODES RANDOMLY ON SUBNETS

EXECUTION NODE SECURITY USING MULTIPLE GATEWAY ENDPOINTS

TECHNICAL FIELD

The subject matter disclosed herein generally relates to methods, systems, and machine-readable storage media for protecting user data in a Virtual Private Cloud (VPC) deployment.

BACKGROUND

Data platforms are widely used for data storage and data access in computing and communication contexts. With respect to architecture, a data platform could be an on-premises data platform, a network-based data platform (e.g., a cloud-based data platform), a combination of the two, or include another type of architecture.

Processes that are associated with a user account may, via one or more types of clients, be able to cause data to be ingested into the database and may also be able to manipulate the data, add additional data, remove data, run queries against the data, generate views of the data, and so forth.

However, a malicious app (application) producer can develop malicious software that can be distributed into the data platform to the accounts of app consumers. The malicious app aims to copy the user's data to the account of the app producer, such as by using the cloud storage of the app producer to save the user's data. Thus, the execution of third-party malicious code within a client's environment poses a risk, as it may facilitate the unauthorized transfer of data through internal stages, which are abstractions built on blob storage systems.

BRIEF DESCRIPTION OF THE DRAWINGS

Various appended drawings illustrate examples of the present disclosure and cannot be considered limiting its scope.

DETAILED DESCRIPTION

Figure 1:
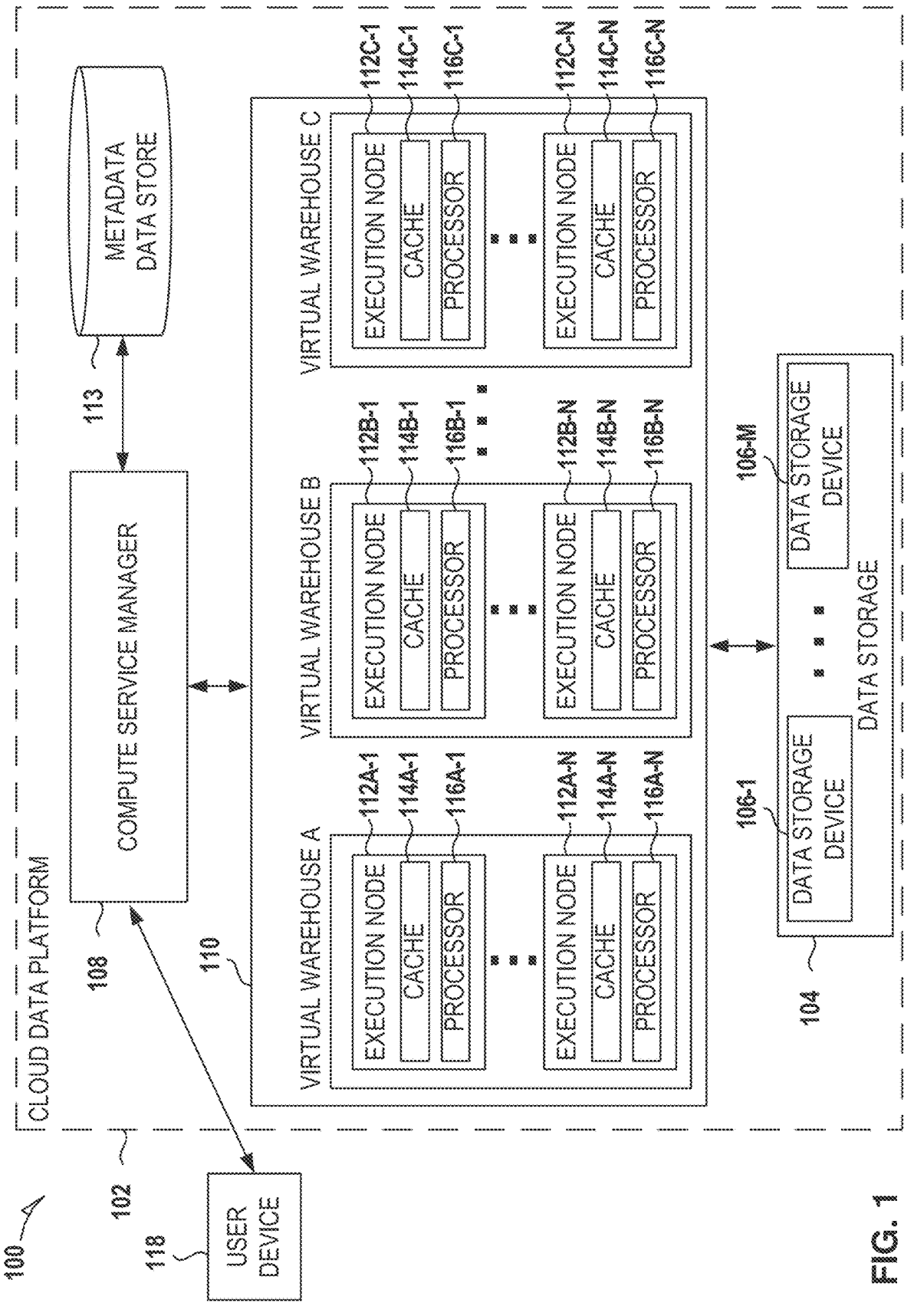
FIG. 1 illustrates a computing environment that includes a cloud data platform, according to some examples.

Reference will now be made in detail to specific examples for carrying out the inventive subject matter. Examples are illustrated in the accompanying drawings, and specific details are set forth in the following description to provide a thorough understanding of the subject matter. It will be understood that these examples are not intended to limit the scope of the claims to the illustrated techniques. On the contrary, they are intended to cover such alternatives, modifications, and equivalents as may be included within the scope of the disclosure.

A stage is a location where data files are stored. In some implementations, three types of stages are implemented: internal, external, and temporary. Internal Stages are managed by the cloud data platform; external stages are kept in cloud storage services (e.g., Amazon S3™, Azure Blob Storage, Google Cloud Storage); and temporary states are internal stages available for the duration of a session and are automatically removed when the session is finished.

Although some examples are presented below with reference to a particular cloud provider, the same principles may be utilized with any of the cloud providers. Therefore, the solutions described for a given cloud provider should not be interpreted to be exclusive or limiting but rather illustrative.

In one attack paradigm, a malicious app producer executes in a user space (e.g., a user working pod). The app producer is the user who creates the app, and the app consumer is the user who executes the app in their own user space (e.g., user account). The attack includes embedding, by the executing app, a "Troy" session token obtained elsewhere, with write access to storage controlled by the producer (e.g., the producer's internal stage). When the consumer runs the app in their legitimate cluster, the malicious code can use the illicit token to exfiltrate the consumer's data to the producer's data storage in the cloud data platform.

Techniques are presented below to stop malicious apps from stealing user data. In one aspect, a method to enhance data storage security in cloud environments uses multiple gateway endpoints to access the cloud service. The solution involves creating multiple networks (e.g., IP subnets) and corresponding gateway endpoints within the cloud data platform. Each network routing table points to its own gateway endpoint, which has a policy to check that the session tags are associated with the gateway endpoint. When a worker node is created, the worker node is assigned to a network (e.g., randomly assigned), and the session token of the worker node includes a tag for the associated gateway endpoint.

The probability that a malicious token will successfully pass through the victim's gateway endpoint is calculated as one divided by N, where N represents the total number of networks. For example, if an attacker obtains a session in one network, the probability that the attacker would be in the same network as the victim is $1/N$ since nodes are placed randomly on networks. For a value of N of 255, there will be 255 networks, and the probability of two nodes being on the same network would be $1/255$, which is 0.4%.

This setup ensures that legitimate access carries the correct session tag. The solution leverages cloud-managed resources, which are free and immutable by attackers, and does not impose additional costs or performance degradation.

In one aspect, a system is presented. The system includes a memory comprising instructions and one or more computer processors. The instructions, when executed by the one or more computer processors, cause the one or more computer processors to perform operations comprising: creating a plurality of networks in a cloud data platform; creating a gateway endpoint for each network from the plurality of networks, each network being associated with a different gateway endpoint, each gateway point having a respective gateway endpoint tag; configuring each gateway endpoint to enable traffic for sessions that are associated with the gateway endpoint tag; placing each execution node created in the cloud data platform in one of the networks from the plurality of networks; and assigning, to each execution node, a session token associated with the gateway endpoint tag of the network where the execution node is placed.

In some examples, each gateway endpoint provides access to a different data storage in the cloud data platform.

In some examples, the method 600 further comprises receiving, by a first gateway endpoint, a network packet associated with a first session, checking that the first session is associated with the gateway endpoint tag of the first gateway endpoint, and dropping the network packet in response to detecting that the first session is not associated with the gateway endpoint tag of the first gateway endpoint.

In some examples, each execution node is placed randomly in one of the networks from the plurality of networks.

In some examples, each network corresponds to a different IP subnet, and each subnet utilizes a different routing table for routing packets to the corresponding gateway endpoint associated with the subnet.

In some examples, each gateway endpoint is provided by a cloud service to access data storage in the cloud service.

In some examples, traffic in the gateway endpoint is not routed for sessions that use gateway endpoint tags for other gateway endpoints.

In some examples, one gateway endpoint tag is used per customer and network, and the execution nodes of the customer in the same network share the gateway endpoint tag.

In some examples, a security manager in the cloud data platform configures the execution nodes with an IP address in the network where the execution node is placed.

In some examples, the operations further comprise dividing the execution nodes into producer execution nodes and consumer execution nodes, where producer execution nodes and consumer execution nodes are not placed in the same network.

In another aspect, a computer-implemented method comprises: creating a plurality of networks in a cloud data platform; creating a gateway endpoint for each network from the plurality of networks, each network being associated with a different gateway endpoint, each gateway point having a respective gateway endpoint tag; configuring each gateway endpoint to enable traffic for sessions that are associated with the gateway endpoint tag; placing each execution node created in the cloud data platform in one of the networks from the plurality of networks; and assigning, to each execution node, a session token associated with the gateway endpoint tag of the network where the execution node is placed.

In yet another general aspect, a tangible machine-readable storage medium (e.g., a non-transitory storage medium) includes instructions that, when executed by a machine, cause the machine to perform operations comprising: creating a plurality of networks in a cloud data platform; creating a gateway endpoint for each network from the plurality of networks, each network being associated with a different gateway endpoint, each gateway point having a respective gateway endpoint tag; configuring each gateway endpoint to enable traffic for sessions that are associated with the gateway endpoint tag; placing each execution node created in the cloud data platform in one of the networks from the plurality of networks; and assigning, to each execution node, a session token associated with the gateway endpoint tag of the network where the execution node is placed.

FIG. 1 illustrates a computing environment 100 that includes a cloud data platform 102 (CDF), according to some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the cloud data platform 102 comprises a three-tier architecture: a compute service manager 108 coupled to a metadata data store 113, an execution platform 110, and data storage 104. The cloud data platform 102 hosts and provides data access, management, reporting, and analysis services to multiple client accounts. Administrative users can create and manage identities (e.g., users, roles, and groups) and use permissions to allow or deny access to the identities to resources and services. The cloud data platform 102 is used for reporting and analysis of integrated data from one or more disparate sources, including storage devices within the data storage 104. The data storage 104 comprises a plurality of computing machines and provides on-demand data storage resources to the cloud data platform 102.

The compute service manager 108 includes multiple services that coordinate and manage operations of the cloud data platform 102. For example, the compute service manager 108 is responsible for performing query optimization and compilation as well as managing clusters of compute nodes that perform query processing (also referred to as "virtual warehouses"). The compute service manager 108 can support any number of client accounts, such as end users providing data storage and retrieval requests, system administrators managing the systems and methods described herein, and other components/devices that interact with compute service manager 108.

The compute service manager 108 is also coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

The compute service manager 108 is in communication with a user device 118. The user device 118 corresponds to a user of one of the multiple client accounts supported by the cloud data platform 102. In some implementations, the compute service manager 108 does not receive any direct communications from the user device 118 and only receives communications concerning jobs from a queue within the cloud data platform 102.

The compute service manager 108 is coupled to the metadata data store 113. The metadata data store 113 stores metadata pertaining to various functions and aspects associated with the cloud data platform 102 and its users. The metadata data store 113 also includes a summary of data stored in data storage 104 as well as data available from local caches. Additionally, the metadata data store 113 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes, each with a data cache and a processor. For example, as shown, virtual warehouse A includes execution nodes 112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution nodes 112B-1 to 112B-N; execution node 112B-1 includes a cache 114B-1 and a processor 116B-1; and execution node 112B-N includes a cache 114B-N and a processor 116B-N. Additionally, virtual warehouse C includes execution nodes 112C-1 to 112C-N; execution node 112C-1 includes a cache 114C-1 and a processor 116C-1; and execution node 112C-N includes a cache 114C-N and a processor 116C-N.

Each execution node of the execution platform 110 is configured to process data storage and retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to add and remove virtual warehouses dynamically, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems, or any other data storage technology. Additionally, the data storage 104 may include distributed file systems (e.g., Hadoop Distributed File Systems (HDFS)), object storage systems, and the like. In some examples, the storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 1. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 1 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage devices 106-1 to 106-M are decoupled from the computing resources associated with the execution platform 110. This architecture supports dynamic changes to the cloud data platform 102 based on the changing data storage/retrieval needs as well as the changing needs of the users and systems. The support of dynamic changes allows the cloud data platform 102 to scale quickly in response to changing demands on the systems and components within the cloud data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the metadata data store 113 assists the compute service manager 108 in determining which nodes in the execution platform 110 have already cached at least a portion of the data needed to process the task. One or more nodes in the execution platform 110 processes the task using data cached by the nodes and, if necessary, data retrieved from the data storage 104.

The compute service manager 108, metadata data store 113, execution platform 110, and data storage 104 are shown in FIG. 1 as individual discrete components. However, each of the compute service manager 108, metadata data store 113, execution platform 110, and data storage 104 may be implemented as a distributed system (e.g., distributed across multiple systems/platforms at multiple geographic locations). Additionally, each of the compute service manager 108, metadata data store 113, execution platform 110, and data storage 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

As shown in FIG. 1, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from and store data to any of the data storage resources in the data storage 104.

Figure 2:
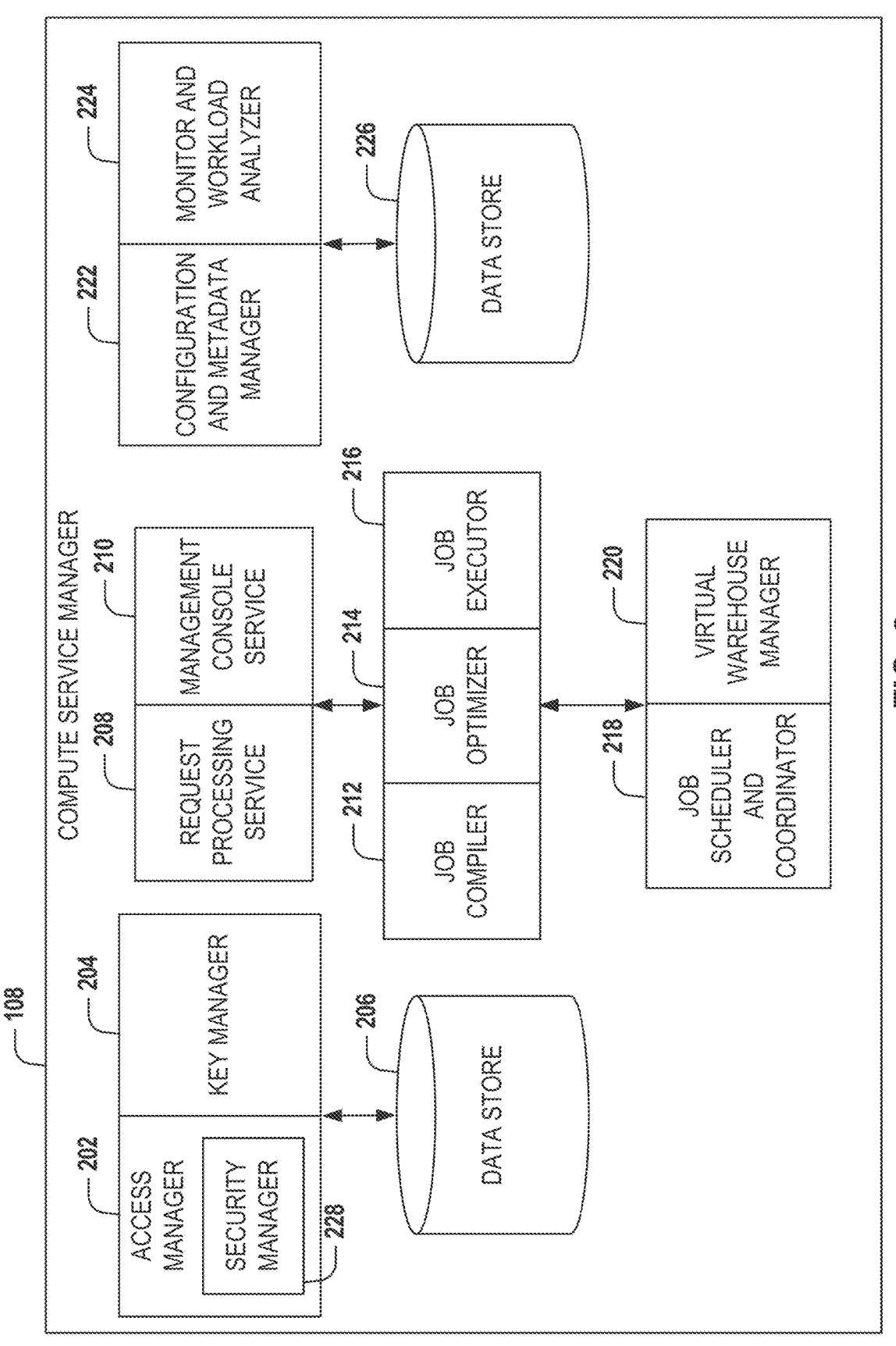
FIG. 2 is a block diagram illustrating components of a compute service manager of the cloud data platform, according to some examples.

FIG. 2 is a block diagram illustrating components of the compute service manager 108 of the cloud data platform, according to some examples. As shown in FIG. 2, the compute service manager 108 includes an access manager 202 and a key manager 204 coupled to a data store 206 that stores access information. Access manager 202 handles authentication and authorization tasks for the systems described herein. The access manager 202 includes a security manager 228 that configures and manages services for the security of data stored by user accounts, as described in more detail below with reference to FIGS. 3-6.

Key manager 204 manages the storage and authentication of keys used during authentication and authorization tasks. For example, access manager 202 and key manager 204 manage the keys used to access data stored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data store 226. Data store 226 in FIG. 2 represents any data repository or device within the cloud data platform 102. For example, data store 226 may represent caches in execution platform 110, storage devices in data storage 104, the metadata data store 113, or any other storage device or system.

Figure 3:
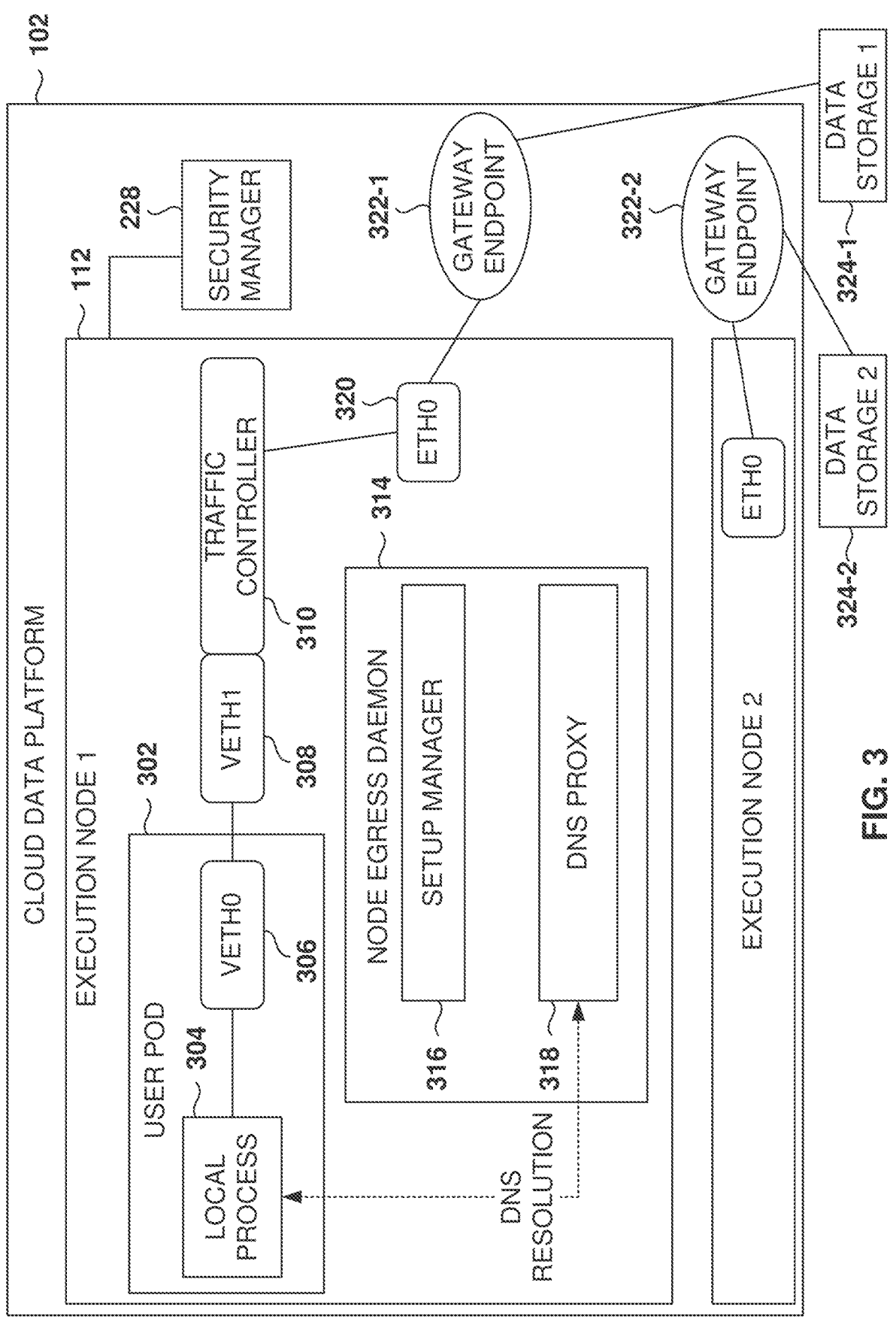
FIG. 3 is a block diagram illustrating components of the cloud data platform for securing data storage, according to some examples.

FIG. 3 is a block diagram illustrating components of the cloud data platform 102 for securing data storage, according to some examples. In some examples, the cloud data platform 102 includes one or more execution nodes. In the illustrated example, there are two execution nodes, execution node 1 and execution node 2, but other embodiments may have one working node or more than two working nodes. In FIG. 3, execution node 112 is shown in detail.

The execution node 112 comprises a user pod 302, which includes a local process 304 connected to a virtual ethernet interface (veth0 306). The local process 304 is a process executing software instructions using the processor of the execution node 112. The local process 304 may execute any app, such as an app developed by the user or an app obtained from a third party. Other examples may include additional user pods within the execution node 112.

It is noted that the examples illustrated in FIG. 3 are examples and do not describe every possible implementation for the processing of internal queries. The principles presented herein regarding the creation of multiple subnets may be used with other implementations with different types of networking, filtering, pod deployment, etc. The embodiments illustrated in FIG. 3 should therefore not be interpreted to be exclusive or limiting, but rather illustrative.

Within user pod 302, veth0 306 is connected to another virtual ethernet interface (veth1 308), which in turn is connected to a traffic controller 310, which filters packets to provide data security and provides other functions, such as network address translation to route packets from a subnet where the user pod is executing to the corresponding gateway endpoint.

In some examples, execution nodes are placed in subnets, and each subnet accesses a different gateway endpoint to access data storage, as discussed in more detail below with reference to FIG. 4.

NAT is a method used to modify the IP address in the headers of IP packets while in transit by mapping a private (internal) IP address to a public (external) IP address and vice versa. The private IP address is used within a local network and is not routable on the public Internet, and the public IP address is routable on the Internet and is used to communicate with external networks.

The execution node 112 further includes a node egress daemon 314, which is a process that includes a setup manager 316 and a DNS proxy 318. The setup manager 316 is responsible for configuring the traffic controller 310. The DNS proxy 318 performs DNS resolution for the user pod 302. DNS is a hierarchical and decentralized naming system used to resolve human-readable domain names (e.g., example.com) into IP addresses (e.g., 192.0.1.2).

The traffic controller 310 stores information to translate internal IP addresses to external IP addresses. That is, for each internal IP address, there is an entry in the table with the internal IP address and the corresponding external IP address. In this context, when an IP packet is transmitted with the destination of the internal IP address, the traffic controller 310 translates the local IP address to the external IP address for transmittal on the network via the gateway endpoint 322-1.

The traffic controller 310 is connected to an ethernet interface (Eth0 320), which facilitates communication with the gateway endpoint 322-1. The gateway endpoint 322-1 is responsible for directing traffic to data storage 324-1 for data storage purposes. In the context of Amazon Web Services (AWS), a gateway endpoint is a type of Virtual Private Cloud (VPC) endpoint that allows secure connections from the VPC to AWS services.

Additionally, the execution node 112 is connected to the security manager 228, which manages the stage security for the execution node 112. The security manager 228 configures the security parameters when the execution node 112 is created, including parameters for the node subnet and the traffic controller 310.

One goal of the cloud data platform 102 is to keep the user data within the governance and security framework of the cloud data platform 102. This includes ensuring that data cannot be exfiltrated from one account to another.

A vulnerability arises when the user executes an app created by a third party. This execution presents a risk of data exfiltration from one account to another through the use of internal stages. Internal stages are abstractions built on top of blob storage systems, such as Amazon S3. For example, a storage path may be represented as S3://bucket/JohnDoe, where "JohnDoe" serves as a suffix designating a specific stage of the user.

The identified vulnerability resembles a Trojan horse attack, where malicious code is introduced into the user's environment. Once operational within the user account, the application may facilitate the unauthorized transfer of data to another user.

Control over DNS resolution and data flow is maintained through the virtual Ethernet pair of veth0 306 and veth1 308. A job or application executed within the cloud data platform 102 is ultimately deployed into a pod running on a node, such as the user pod 302 in the execution node 112. Network communication from the user pod 302 is managed using the virtual Ethernet pair veth0 306 and veth1 308. That is, one end of this pair resides within the user pod 302, while the other end is located on the execution node 112 outside the user pod 302.

Figure 4:
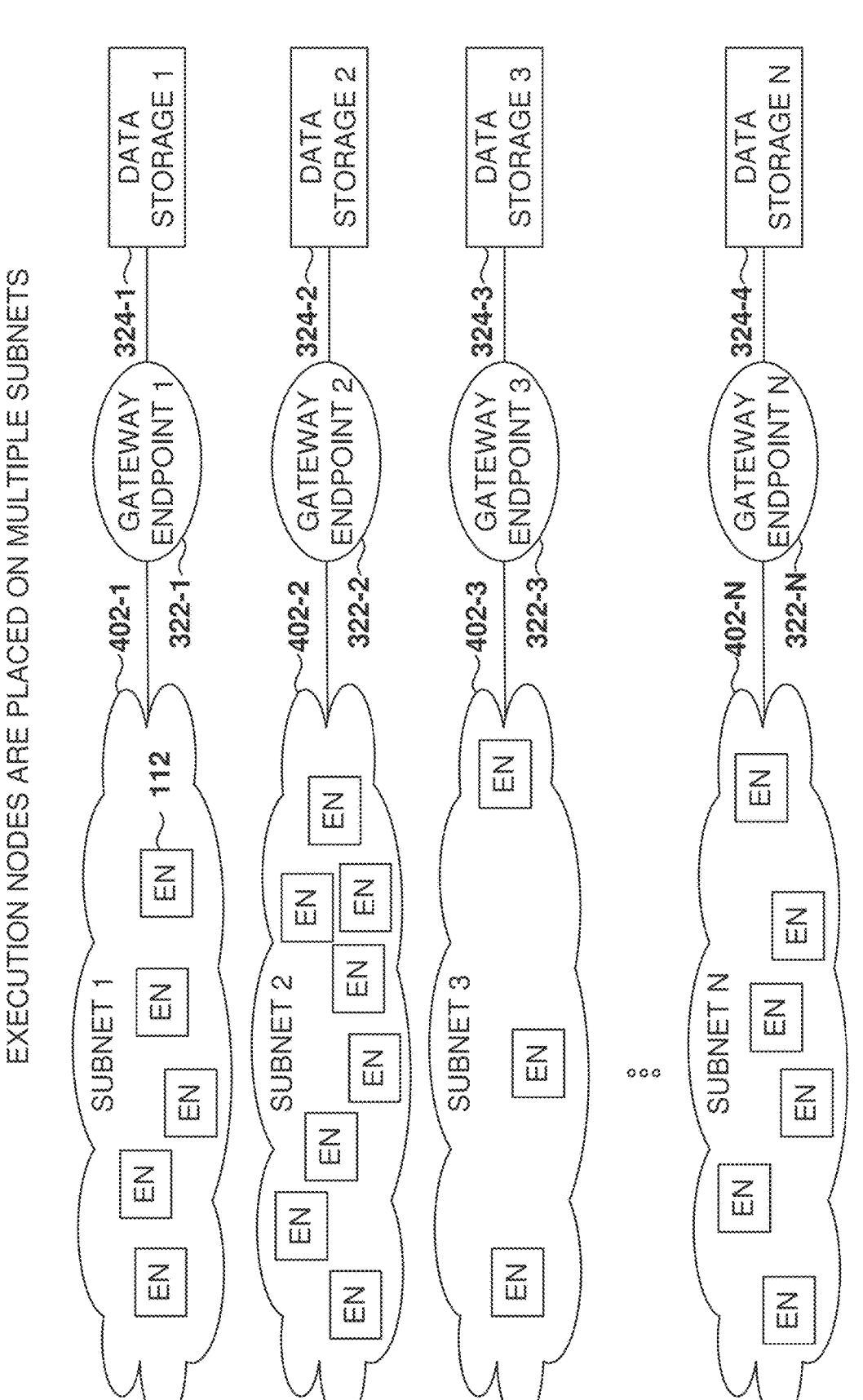
FIG. 4 illustrates the assignment of execution nodes to different subnets with respective gateway endpoints, according to some examples.

FIG. 4 illustrates the assignment of execution nodes to different subnets with respective gateway endpoints, according to some examples. This setup enhances internal stage security by using multiple gateway endpoints within a cloud data platform.

In the illustrated system, execution nodes 112 (EN) are distributed across multiple subnets 402-1 to 402-N. Each subnet hosts a collection of execution nodes that are responsible for performing various computational tasks. As used herein, the suffix "-I" is used as a generic term to describe the corresponding subnet, gateway endpoint, and data storage.

Each subnet 402-I is connected to a respective gateway endpoint 322-I. For instance, subnet 402-1 is connected to gateway endpoint 322-1, subnet 402-2 is connected to gateway endpoint 322-2, and subnet 402-N is connected to gateway endpoint 322-N.

The gateway endpoints 322-I serve as intermediaries between the execution nodes 112 within their respective subnets 402-I and the corresponding data storage 324-I. Each gateway endpoint 322-I is responsible for managing the data flow between its associated subnet 402-I and the respective data storage 324-I. For example, the gateway endpoint 322-1 is connected to the data storage 324-1, the gateway endpoint 322-2 is connected to the data storage 324-2, the gateway endpoint 322-3 is connected to the data storage 324-3, the gateway endpoint 322-4 is connected to the data storage 324-4, and the gateway endpoint 322-N is connected to the data storage 324-N.

Each execution node 112 is assigned to a corresponding subnet 402-I and is configured to use a session token that includes a gateway endpoint tag corresponding to the gateway endpoint 322-I associated with that subnet 402-I. This configuration ensures that the execution node 112 can access data storage through the designated gateway endpoint, thereby enhancing security by reducing the risk of unauthorized data exfiltration.

A session token is a temporary, unique identifier used to authenticate and authorize access to resources within a cloud data platform. The session token is generated when a session is initiated and is used to ensure that only authorized entities can access specific resources during the session. The session token typically includes various attributes and tags that define the scope and permissions of the session. The session token is generated by an authentication service or security manager when a session is initiated. The token is created based on the credentials and permissions of the user or process initiating the session.

The session token includes attributes and tags that define the scope of the session. For example, in the context of a cloud data platform, the session token may include a gateway endpoint tag that specifies which gateway endpoint the session is authorized to use. Other attributes may include user roles, access levels, and expiration times.

The session token is used to authenticate and authorize access to resources within the cloud data platform. When a request is made to access a resource, the session token is checked to ensure that it includes the necessary attributes and tags for the requested operation. If the token is valid and includes the required permissions, access is granted.

Session tokens are typically temporary and have a limited lifespan. They are valid only for the duration of the session and expire after a predefined period. This temporary nature enhances security by reducing the risk of token misuse.

The gateway endpoints 322-I are configured with policies that check session tags to ensure that only sessions with the correct tag (the session tag that is associated with the corresponding gateway endpoint) can access the data storage 324-I. This policy prevents unauthorized access to a different data storage unit and ensures that data traffic is securely routed through the appropriate gateway endpoint. Each gateway endpoint 322-I directs traffic to the corresponding data storage 324-I, ensuring that data operations are confined to the designated storage area.

Data storage 324-I is the storage resource associated with each gateway endpoint. The data storage 324-I stores data files and ensures that data access is restricted to sessions with the correct session tag. This configuration prevents unauthorized data access and ensures that data remains secure within the cloud data platform.

Figure 5:
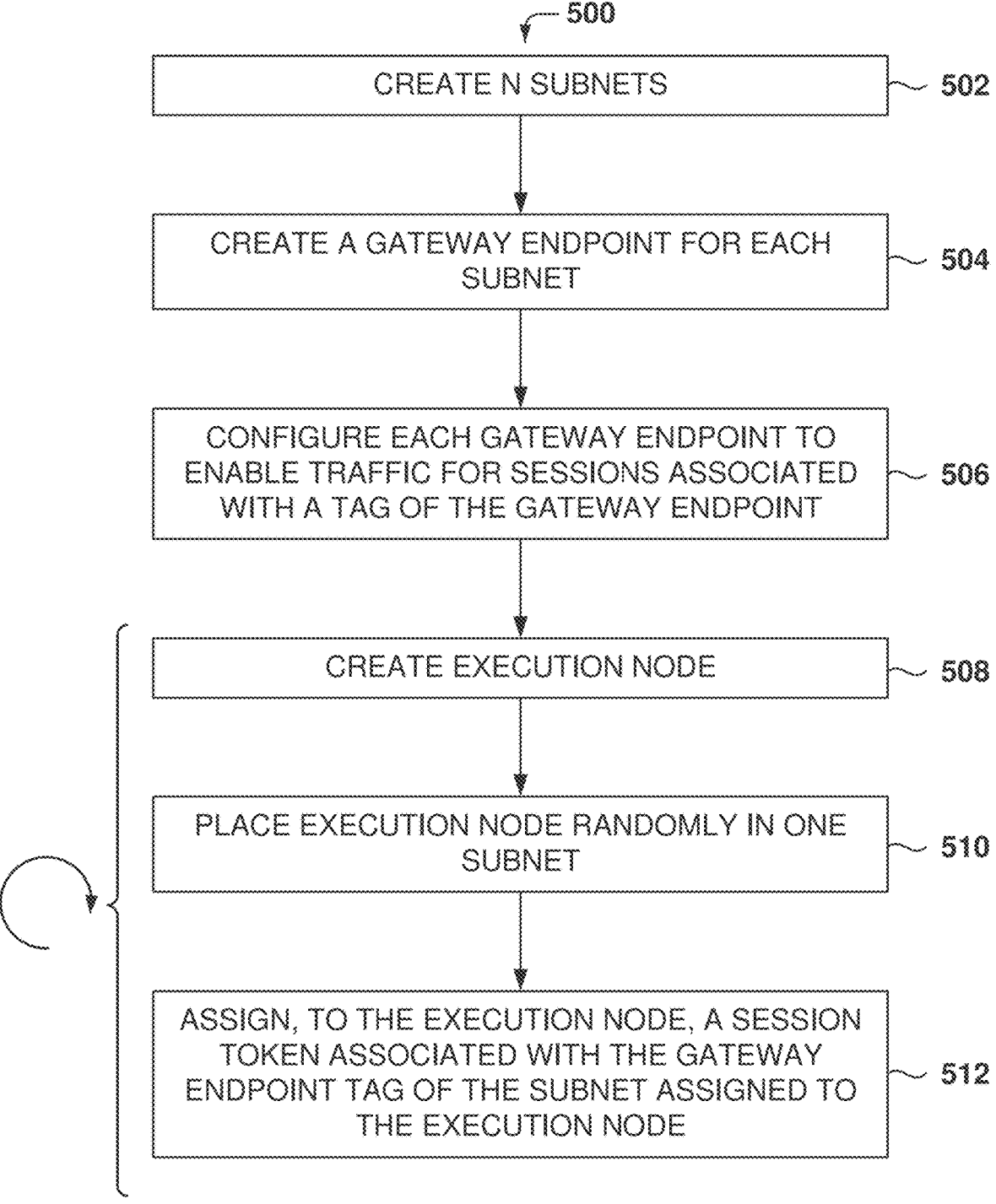
FIG. 5 is a flowchart of a method for setting up execution nodes for secure access, according to some examples.

FIG. 5 is a flowchart of a method 500 for setting up execution nodes for secure access, according to some examples. While the various operations in this flowchart are presented and described sequentially, one of ordinary skill will appreciate that some or all of the operations may be executed in a different order, be combined or omitted, or be executed in parallel.

Operation 502 is for creating a plurality of subnets in a cloud data platform. In some examples, operation 502 is performed by the security manager, which configures the network architecture to include multiple subnets. Each subnet is defined within the cloud data platform.

The example of FIG. 5 refers to the creation of multiple subnets, but the same principle may be used for the creation of a network that includes a plurality of nodes that share access through the respective gateway endpoint. Thus, the division into subnets is one example of how the nodes can be assigned to different networks.

From operation 502, the method 500 flows to operation 504 for creating a gateway endpoint for each subnet from the plurality of subnets. Each subnet is associated with a different gateway endpoint, and each gateway endpoint has a respective gateway endpoint tag. The gateway endpoints are configured by the security manager to facilitate secure communication between the execution nodes and the data storage. The gateway endpoints are responsible for routing traffic to the appropriate data storage based on the session tags.

From operation 504, the method 500 flows to operation 506 for configuring each gateway endpoint to enable traffic for sessions that are associated with the gateway endpoint tag. This configuration is performed by the security manager, which sets policies for each gateway endpoint to check the session tags. The policies ensure that only sessions with the correct tag can access the data storage through the gateway endpoint, thereby preventing unauthorized access.

A gateway endpoint tag is an identifier associated with the gateway endpoint within the cloud data platform. This gateway endpoint tag is used to control and manage access to data storage resources by ensuring that only authorized sessions can route traffic through the gateway endpoint. The gateway endpoint tag is included in the session token assigned to execution nodes and is used to implement the security policies configured for each gateway endpoint.

Each gateway endpoint in the cloud data platform is assigned a unique gateway endpoint tag. This gateway endpoint tag is used to identify the gateway endpoint and to enforce security policies that restrict access to data storage resources.

When an execution node is created and placed in a subnet, the execution node is assigned a session token that includes the gateway endpoint tag corresponding to the gateway endpoint associated with that subnet. This ensures that the execution node can only access data storage through the designated gateway endpoint.

The gateway endpoint is configured with policies that check the session tags of incoming network packets. These policies ensure that only sessions with the correct gateway endpoint tag can access the data storage. If a network packet's session tag does not match the gateway endpoint tag, the packet is dropped, preventing unauthorized access.

The gateway endpoint tag is used to route traffic from the execution nodes to the appropriate data storage. By including the tag in the session token, the cloud data platform ensures that data operations are confined to the designated storage area, enhancing security and reducing the risk of data exfiltration.

From operation 506, the method 500 flows to operation 508. Operations 508, 510, and 512 are performed for each execution node that is created. Operation 508 is for creating one execution node.

From operation 508, the method 500 flows to operation 510 for placing the created execution node in one of the subnets from the plurality of subnets.

In some examples, the placement is random to enhance security by reducing the predictability of the network configuration. However, in other examples, different assignment policies may be included, such as round robin, assignment based on a number of existing nodes on the subnet (e.g., load balancing), assigning nodes that may execute shared software in subnets different from nodes that do not use shared software, etc.

From operation 510, the method 500 flows to operation 512 for assigning, to each execution node, a session token associated with the gateway endpoint tag of the subnet where the execution node is placed. The session token is generated by the security manager and includes a gateway endpoint tag that corresponds to the gateway endpoint of the assigned subnet. This ensures that the execution node can access data storage through the designated gateway endpoint.

The sequence and decision-making process in the method 500 ensures that each execution node is securely placed within a subnet and can only access data storage through the appropriate gateway endpoint. The use of session tags and gateway endpoint policies significantly reduces the risk of data exfiltration by ensuring that only authorized sessions can access the data storage. This method leverages cloud-managed resources, which are free and immutable by attackers, and does not impose additional costs or performance degradation.

Figure 6:
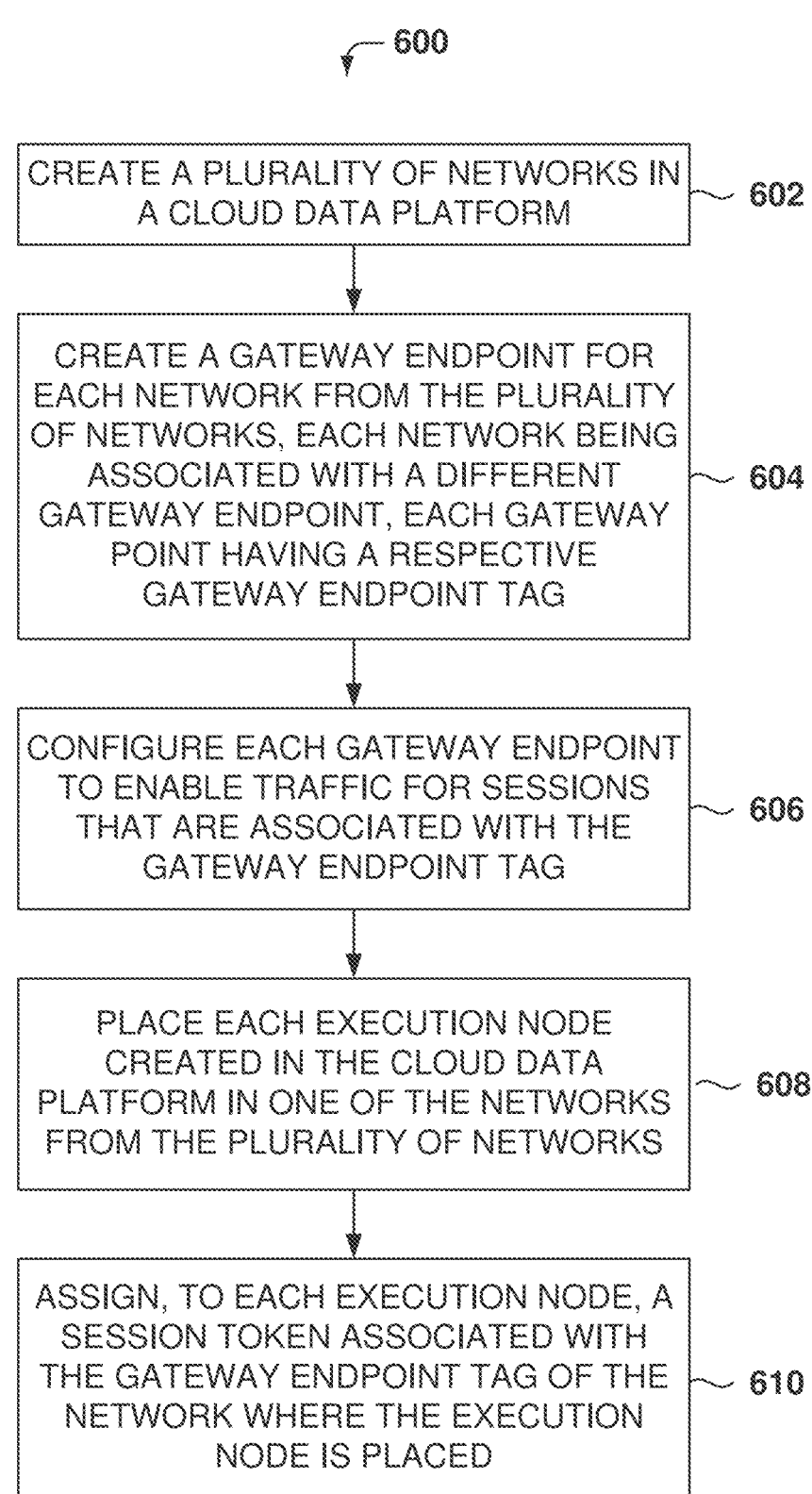
FIG. 6 is a flowchart of a method for securing data storage in the cloud data platform, according to some examples.

FIG. 6 is a flowchart of a method 600 for securing data storage in the cloud data platform, according to some examples. While the various operations in this flowchart are presented and described sequentially, one of ordinary skill will appreciate that some or all of the operations may be executed in a different order, be combined or omitted, or be executed in parallel.

Operation 602 is for creating a plurality of networks in a cloud data platform, each serving as a distinct network segment for organizing and managing execution nodes. In some examples, each network includes one or more execution nodes, and the execution nodes in the network share the access to the same gateway endpoint. In some examples, the network refers to an IP subnet, but other grouping of nodes may be implemented.

From operation 602, the method 600 flows to operation 604 for creating a gateway endpoint for each network from the plurality of networks. Each network is associated with a different gateway endpoint, and each gateway endpoint has a respective gateway endpoint tag. This operation ensures that each network has a dedicated gateway endpoint, which is identified by a gateway endpoint tag, facilitating secure and controlled access to data storage.

From operation 604, the method 600 flows to operation 606 for configuring each gateway endpoint to enable traffic for sessions that are associated with the gateway endpoint tag. This operation involves setting up policies for each gateway endpoint to check session tags, ensuring that only sessions with the correct tag can route traffic through the gateway endpoint, thereby preventing unauthorized access.

From operation 606, the method 600 flows to operation 608 for placing each execution node created in one of the networks from the plurality of networks. In some examples, the execution node is placed randomly in one of the networks.

From operation 608, the method 600 flows to operation 610 for assigning, to each execution node, a session token associated with the gateway endpoint tag of the network where the execution node is placed. Operation 610 ensures that each execution node can only access data storage through the designated gateway endpoint, enhancing security by reducing the risk of unauthorized data exfiltration.

In view of the disclosure above, various examples are set forth below. It should be noted that one or more features of an example, taken in isolation or combination, should be considered within the disclosure of this application.

Example 1. A system comprising: a memory comprising instructions; and one or more computer processors, the instructions, when executed by the one or more computer processors, causing the system to perform operations comprising: creating a plurality of networks in a cloud data platform; creating a gateway endpoint for each network from the plurality of networks, each gateway being associated with a different gateway endpoint, each gateway point having a respective gateway endpoint tag; configuring each gateway endpoint to enable traffic for sessions that are associated with the gateway endpoint tag; placing each execution node created in the cloud data platform in one of the networks from the plurality of networks; and assigning, to each execution node, a session token associated with the gateway endpoint tag of the network where the execution node is placed.

Example 2. The system as recited in Example 1, wherein each gateway endpoint provides access to a different data storage in the cloud data platform.

Example 3. The system as recited in Examples 1-2, wherein the instructions further cause the one or more computer processors to perform operations comprising: receiving, by a first gateway endpoint, a network packet associated with a first session; checking that the first session is associated with the gateway endpoint tag of the first gateway endpoint; and dropping the network packet in response to detecting that the first session is not associated with the gateway endpoint tag of the first gateway endpoint.

Example 4. The system as recited in Examples 1-3, wherein each execution node is placed randomly in one of the networks from the plurality of networks.

Example 1. The system as recited in Examples 1-4, wherein each network corresponds to a subnet, wherein each subnet utilizes a different routing table for routing packets to the corresponding gateway endpoint associated with the subnet.

Example 6. The system as recited in Examples 1-5, wherein each gateway endpoint is provided by a cloud service to access data storage in the cloud service.

Example 7. The system as recited in Examples 1-6, wherein traffic in the gateway endpoint is not routed for sessions that use gateway endpoint tags for other gateway endpoints.

Example 8. The system as recited in Examples 1-7, wherein one gateway endpoint tag is used per customer and network, and the execution nodes of the customer in the same subnet share the gateway endpoint tag.

Example 9. The system as recited in Examples 1-8, wherein a security manager in the cloud data platform configures the execution nodes with an internet protocol (IP) address in the network where the execution node is placed.

Example 10. The system as recited in Examples 1-9, further comprising: dividing the execution nodes into producer execution nodes and consumer execution nodes, wherein producer execution nodes and consumer execution nodes are not placed in the same network.

Example 11. A computer-implemented method comprising: creating a plurality of networks in a cloud data platform; creating a gateway endpoint for each network from the plurality of networks, each network being associated with a different gateway endpoint, each gateway point having a respective gateway endpoint tag; configuring each gateway endpoint to enable traffic for sessions that are associated with the gateway endpoint tag; placing each execution node created in the cloud data platform in one of the networks from the plurality of networks; and assigning, to each execution node, a session token associated with the gateway endpoint tag of the network where the execution node is placed.

Example 12. The method as recited in Example 11, wherein each gateway endpoint provides access to a different data storage in the cloud data platform.

Example 13. The method as recited in Examples 11-12, further comprising: receiving, by a first gateway endpoint, a network packet associated with a first session; checking that the first session is associated with the gateway endpoint tag of the first gateway endpoint; and dropping the network packet in response to detecting that the first session is not associated with the gateway endpoint tag of the first gateway endpoint.

Example 14. The method as recited in Examples 11-13, wherein each execution node is placed randomly in one of the networks from the plurality of networks.

Example 15. The method as recited in Examples 11-14, wherein each network corresponds to a subnet, wherein each subnet utilizes a different routing table for routing packets to the corresponding gateway endpoint associated with the subnet.

Example 16. A machine-storage medium including instructions that, when executed by a machine, cause the machine to perform operations comprising: creating a plurality of networks in a cloud data platform; creating a gateway endpoint for each network from the plurality of networks, each network being associated with a different gateway endpoint, each gateway point having a respective gateway endpoint tag; configuring each gateway endpoint to enable traffic for sessions that are associated with the gateway endpoint tag; placing each execution node created in the cloud data platform in one of the networks from the plurality of networks; and assigning, to each execution node, a session token associated with the gateway endpoint tag of the network where the execution node is placed.

Example 17. The machine-storage medium as recited in Example 16, wherein each gateway endpoint provides access to a different data storage in the cloud data platform.

Example 18. The machine-storage medium as recited in Examples 16-17, wherein the machine further performs operations comprising: receiving, by a first gateway endpoint, a network packet associated with a first session; checking that the first session is associated with the gateway endpoint tag of the first gateway endpoint; and dropping the network packet in response to detecting that the first session is not associated with the gateway endpoint tag of the first gateway endpoint.

Example 19. The machine-storage medium as recited in Examples 16-18, wherein each execution node is placed randomly in one of the networks from the plurality of networks.

Example 20. The machine-storage medium as recited in Examples 16-19, wherein each network corresponds to a subnet, wherein each subnet utilizes a different routing table for routing packets to the corresponding gateway endpoint associated with the subnet.

Figure 7:
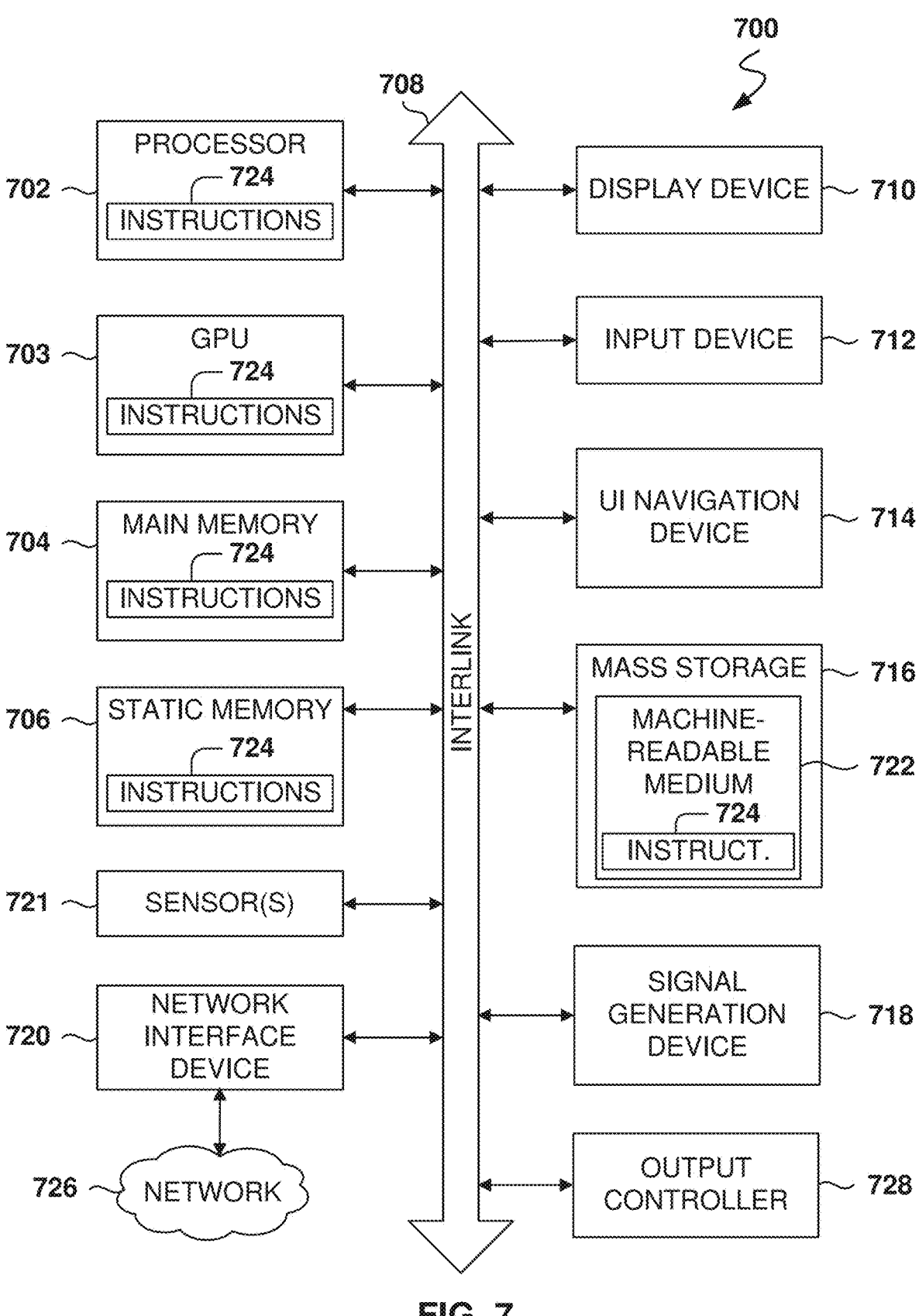
FIG. 7 is a block diagram illustrating an example of a machine upon or by which one or more example process examples described herein may be implemented or controlled.

FIG. 7 is a block diagram illustrating an example of a machine 700 upon or by which one or more example process examples described herein may be implemented or controlled. In alternative examples, the machine 700 may operate as a standalone device or be connected (e.g., networked) to other machines. In a networked deployment, the machine 700 may operate in the capacity of a server machine, a client machine, or both in server-client network environments. In an example, the machine 700 may act as a peer machine in a peer-to-peer (P2P) (or other distributed) network environment. Further, while only a single machine 700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 700 (e.g., computer system) may include a hardware processor 702 (e.g., a central processing unit (CPU), a hardware processor core, or any combination thereof), a graphics processing unit (GPU 703), a main memory 704, and a static memory 706, some or all of which may communicate with each other via an interlink 708 (e.g., bus). The machine 700 may further include a display device 710, an alphanumeric input device 712 (e.g., a keyboard), and a user interface (UI) navigation device 714 (e.g., a mouse). In an example, the display device 710, alphanumeric input device 712, and UI navigation device 714 may be a touch screen display. The machine 700 may additionally include a mass storage device 716 (e.g., drive unit), a signal generation device 718 (e.g., a speaker), a network interface device 720, and one or more sensors 721, such as a Global Positioning System (GPS) sensor, compass, accelerometer, or another sensor. The machine 700 may include an output controller 728, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 702 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 702 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 702 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 702 may be emulated in software, running on a physical processor, as a virtual processor or virtual circuit. The virtual processor may behave like an independent processor but is implemented in software rather than hardware.

The mass storage device 716 may include a machine-readable medium 722 on which one or more sets of data structures or instructions 724 (e.g., software) embodying or utilized by any of the techniques or functions described herein. The instructions 724 may also reside, completely or at least partially, within the main memory 704, within the static memory 706, within the hardware processor 702, or the GPU 703 during execution thereof by the machine 700. For example, one or any combination of the hardware processor 702, the GPU 703, the main memory 704, the static memory 706, or the mass storage device 716 may constitute machine-readable media.

While the machine-readable medium 722 is illustrated as a single medium, the term "machine-readable medium" may include a single medium or multiple media (e.g., a centralized or distributed database and associated caches and servers) configured to store one or more instructions 724.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The term "machine-readable medium" may include any medium that is capable of storing, encoding, or carrying instructions 724 for execution by the machine 700 and that causes the machine 700 to perform any one or more of the techniques of the present disclosure or that is capable of storing, encoding, or carrying data structures used by or associated with such instructions 724. Non-limiting machine-readable medium examples may include solid-state memories and optical and magnetic media. For example, a massed machine-readable medium comprises a machine-readable medium 722 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media.

The instructions 724 may be transmitted or received over a communications network 726 using a transmission medium via the network interface device 720. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 724 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A system comprising:
a memory comprising instructions; and
one or more computer processors, the instructions, when executed by the one or more computer processors, causing the system to perform operations comprising:
creating a plurality of networks in a cloud data platform;
creating a gateway endpoint for each network from the plurality of networks, each network being associated with a different gateway endpoint, each gateway endpoint having a respective gateway endpoint tag;
configuring each gateway endpoint to enable traffic for sessions that are associated with the gateway endpoint tag;
placing each execution node created in the cloud data platform in one of the networks from the plurality of networks; and
assigning, to each execution node, a session token associated with the gateway endpoint tag of the network where the execution node is placed.

2. The system as recited in claim 1, wherein each gateway endpoint provides access to a different data storage in the cloud data platform.

3. The system as recited in claim 1, wherein the instructions further cause the one or more computer processors to perform operations comprising:
receiving, by a first gateway endpoint, a network packet associated with a first session;
checking that the first session is associated with the gateway endpoint tag of the first gateway endpoint; and
dropping the network packet in response to detecting that the first session is not associated with the gateway endpoint tag of the first gateway endpoint.

4. The system as recited in claim 1, wherein each execution node is placed randomly in one of the networks from the plurality of networks.

5. The system as recited in claim 1, wherein each network corresponds to a subnet, wherein each subnet utilizes a different routing table for routing packets to the corresponding gateway endpoint associated with the subnet.

6. The system as recited in claim 1, wherein each gateway endpoint is provided by a cloud service to access data storage in the cloud service.

7. The system as recited in claim 1, wherein traffic in the gateway endpoint is not routed for sessions that use gateway endpoint tags for other gateway endpoints.

8. The system as recited in claim 1, wherein one gateway endpoint tag is used per customer and network, and the execution nodes of the customer in the same subnet share the gateway endpoint tag.

9. The system as recited in claim 1, wherein a security manager in the cloud data platform configures the execution nodes with an internet protocol (IP) address in the network where the execution node is placed.

10. The system as recited in claim 1, further comprising:
dividing the execution nodes into producer execution nodes and consumer execution nodes, wherein producer execution nodes and consumer execution nodes are not placed in the same network.

11. A computer-implemented method comprising:
creating a plurality of networks in a cloud data platform;
creating a gateway endpoint for each network from the plurality of networks, each network being associated with a different gateway endpoint, each gateway endpoint having a respective gateway endpoint tag;
configuring each gateway endpoint to enable traffic for sessions that are associated with the gateway endpoint tag;
placing each execution node created in the cloud data platform in one of the networks from the plurality of networks; and
assigning, to each execution node, a session token associated with the gateway endpoint tag of the network where the execution node is placed.

12. The method as recited in claim 11, wherein each gateway endpoint provides access to a different data storage in the cloud data platform.

13. The method as recited in claim 11, further comprising:
receiving, by a first gateway endpoint, a network packet associated with a first session;
checking that the first session is associated with the gateway endpoint tag of the first gateway endpoint; and
dropping the network packet in response to detecting that the first session is not associated with the gateway endpoint tag of the first gateway endpoint.

14. The method as recited in claim 11, wherein each execution node is placed randomly in one of the networks from the plurality of networks.

15. The method as recited in claim 11, wherein each network corresponds to a subnet, wherein each subnet utilizes a different routing table for routing packets to the corresponding gateway endpoint associated with the subnet.

16. A non-transitory machine-storage medium including instructions that, when executed by a machine, cause the machine to perform operations comprising:
creating a plurality of networks in a cloud data platform;
creating a gateway endpoint for each network from the plurality of networks, each network being associated with a different gateway endpoint, each gateway endpoint having a respective gateway endpoint tag;
configuring each gateway endpoint to enable traffic for sessions that are associated with the gateway endpoint tag;
placing each execution node created in the cloud data platform in one of the networks from the plurality of networks; and
assigning, to each execution node, a session token associated with the gateway endpoint tag of the network where the execution node is placed.

17. The machine-storage medium as recited in claim 16, wherein each gateway endpoint provides access to a different data storage in the cloud data platform.

18. The machine-storage medium as recited in claim 16, wherein the machine further performs operations comprising:

receiving, by a first gateway endpoint, a network packet associated with a first session;

checking that the first session is associated with the gateway endpoint tag of the first gateway endpoint; and dropping the network packet in response to detecting that the first session is not associated with the gateway endpoint tag of the first gateway endpoint.

19. The machine-storage medium as recited in claim 16, wherein each execution node is placed randomly in one of the networks from the plurality of networks.

20. The machine-storage medium as recited in claim 16, wherein each network corresponds to a subnet, wherein each subnet utilizes a different routing table for routing packets to the corresponding gateway endpoint associated with the subnet.

\* \* \* \* \*